3,551,198
METHOD OF MANUFACTURING AN IMPREGNATED TUNGSTEN DISPENSER CATHODE
Antonius Johannes Alberta van Stratum and Henricus Hubertus Peeter, Emmasingel, Netherlands, assignors, by mesne assignments, to U.S. Philips Corporation, New York, N.Y., a corporation of Delaware
Filed June 6, 1967, Ser. No. 644,002
Claims priority, application Netherlands, July 1, 1966, 6609171
Int. Cl. C23d 5/00
U.S. Cl. 117—224          5 Claims

ABSTRACT OF THE DISCLOSURE

A method of impregnating a dispenser cathode without first prefusing the aluminate constituents, in which the constituents are coprecipitated, a carbon compound such as sugar added and a suspension formed which is applied to the porous tungsten, and then the assembly processed in hydrogen at a first temperature to dissociate the carbonates, a second temperature to form the aluminate, and a third temperature to melt the aluminate in.

---

Figure 1:
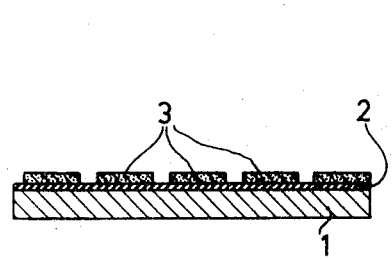

The invention relates to a method of manufacturing a dispenser cathode comprising a porous sintered tungsten body impregnated with aluminates, particularly barium calcium aluminate. U.S. Pats. 2,700,000 and 3,201,639 describe such cathodes in detail, the contents of which patents are hereby incorporated by reference thereto.

According to one known commercial method, the constituents required for the formation of the aluminate, generally barium carbonate, calcium carbonate and aluminum oxide, are mixed in the pulverulent state and heated in a hydrogen atmosphere or in vacuum at approximately 950° C. in order to obtain the desired barium calcium aluminate. The temperature is then raised to approximately 1625° C. and the aluminate melts. After cooling, the solidified mass is removed from the furnace and crumbled. The crumbled powder is then applied to the tungsten bodies to be impregnated and absorbed therein by melting in vacuum or in a hydrogen atmosphere.

This method is comparatively complicated and hence expensive, but is used for the following reasons. During the formation of the aluminates in vacuum, gaseous carbon dioxide is generated and dissociated at higher temperatures into carbon monoxide and oxygen. To obtain the optimum cathodes, this gas must be prevented from contacting the tungsten bodies. Thus, the said mixture of the constituents required for the formation of the aluminate are not directly applied to the surface of the porous tungsten body in the commercial method, and the aluminate is not formed on said surface by heating this body in vacuum to be directly absorbed in said body after melting. Moreover, the carbonates cannot be mixed with sufficient homogeneity.

It has been found, however, that when the aluminate is melted for the first time, the tungsten body can be impregnated with said aluminate so that the method of manufacturing impregnated cathodes is considerably simplified. According to the invention, the constituents required for the formation of the aluminate are obtained by co-precipitation and mixed homogeneously with a soluble carbon-containing compound, preferably sugar, and a binder, which mixture is brought in the form of a layer into contact with the surfaces of the porous bodies to be impregnated. The bodies to be impregnated and the mixture layer are then heated in a hydrogen atmosphere at such a high temperature (about 1000° C.) for such a long time that the carbonates are completely dissociated and the gases developed are removed, after which the temperature is increased to approximately 1400° C. in order to accelerate the formation of aluminates and to reduce any tungsten oxides produced in the porous body without melting of any of the constituents. Finally, the temperature is increased to above 1600° C. so that the aluminate melts and is absorbed in the porous body, these bodies then being cooled and removed from the furnace.

The suspension of the coprecipitated carbonate mixture in the binder and the soluble carbon-containing compound may be directly applied to the surfaces of the porous bodies, for example by spraying, but alternatively, this suspension may be applied in the form of a layer to a tungsten substrate, the porous bodies then being disposed on said layer. It is essential for the heating to be carried out in a hydrogen atmosphere and at a low rate so that the gaseous carbon dioxide is converted to CO and water vapor before it can strongly oxidize the tungsten of the body to be impregnated. In vacuum, the $CO_2$ would dissociate at the temperature at which the carbonates dissociate into CO and O and thus would have a strongly oxidizing effect. Therefore, the use of a hydrogen atmosphere is necessary. By the addition of the carbon-containing compound and by a correct heating in the hydrogen atmosphere before the aluminate melts, the carbon causes some CaO to be converted into calcium carbide which proves to enhance the electron emission and to stabilize this emission over a long period of use.

Consequently, in the method according to the invention the separate manufacturing, melting and crumbling of the aluminate are dispensed with, which latter operations in the known method must be carried out in a dry atmosphere, since otherwise the aluminate is converted back in part to hydroxides and carbonates by moisture and carbon dioxide from the ambient atmosphere. Therefore, in the known method, only a small quantity of aluminate could be processed at a time. It is not necessary to use an atmosphere free from carbon dioxide provided that this atmosphere is very dry, since in this case, carbonates are formed at a sufficiently low rate.

In the method according to the invention, a large number of porous bodies can be impregnated simultaneously and this method is thus suitable to be carried out in a tunnel furnace.

Figure 3:
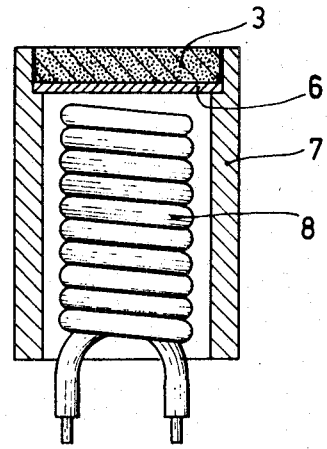
Figure 2A:
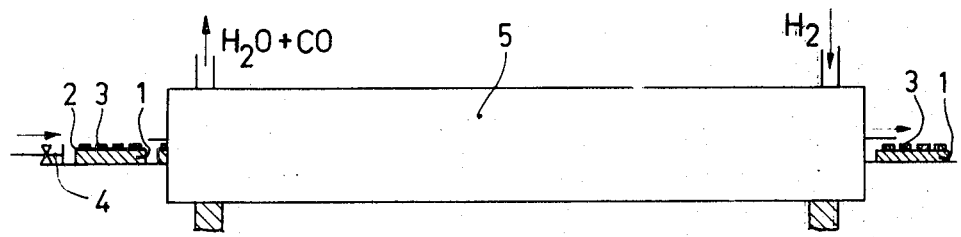
Figure 2B:
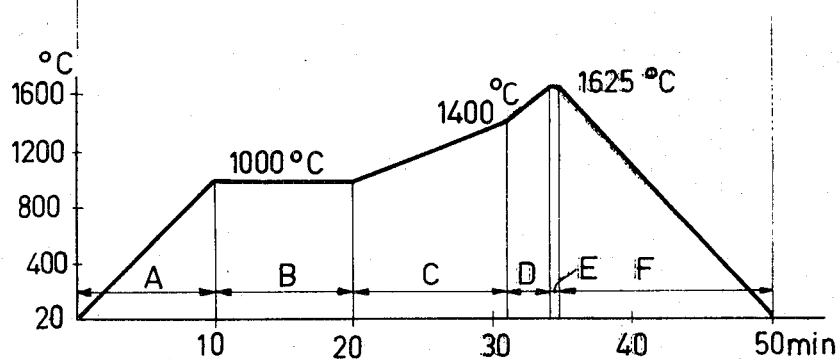

The invention will now be described in greater detail with reference to examples and the accompanying drawings, in which: FIG. 1 shows a substrate to which a layer of a suspension forming an aluminate is applied, with porous bodies being disposed on said layer; FIGS. 2a and 2b show, respectively, a furnace and a graph on which the temperature zones are plotted, and FIG. 3 is a sectional view of one form of a cathode manufactured by the method in accordance with the invention.

Referring now to FIG. 1, reference numeral 1 denotes a substrate consisting of a non-porous tungsten plate. Molybdenum can be substituted for the tungsten.

A coprecipitated mixture of 5 mol of $BaCO_3$, 3 mol of $CaCO_3$ and 2 mol of $Al_2O_3 \cdot nH_2O$ is suspended in nitrocellulose or like binder with 3% by weight of sugar ($C_{12}H_{22}O_{11}$). The preferred way of forming the suspension is as follows: Dissolve 52.3 g. $Ba(NO_3)_2$ in 500 ml. $H_2O$; dissolve 60 g. $Al(NO_3)_3 \cdot nH_2O$ in 500 ml. $H_2O$ and dissolve 28.3 g. $Ca(NO_3)_3 \cdot 4 H_2O$ in 500 ml. $H_2O$. Mix these solutions thoroughly and add it while vigorously stirring to a solution of 65 g. $(NH_4)_2 CO_3$ in 500 ml. $H_2O$. Thereby a thorough mixture of $BaCO_3$, $CaCO_3$ and $Al_2O_3 \cdot nH_2O$ in the above ratio is precipitated. The precipitate is filtered and washed till it is $NO_3$ free, then rinsed with ethanol and dried in an oven at 120° C. during 1 hour. 100 g. of this powder is then mixed to a slurry with a solution of 3 g. of sugar $C_{12}H_{22}O_{11}$ in 50 ml. distilled $H_2O$. The slurry is dried and ground and then suspended in the binder. The technique just described is not critical. Other methods for coprecipitating the carbonate and oxide constituents, which as such are well-known, can be substituted for the method described. The proportions of the barium carbonate, calcium carbonate and aluminum oxide can be varied over the wide range described in U.S. Pat. 3,201,639. That is to say, the mole ratio of $BaO \cdot Al_2O_3$ should exceed 1:1, with the CaO addition, or SrO present in the ratio exceeding 0.1 mole. The preferred ratios, common in commercial impregnated tungsten dispenser cathodes, is 5:2:3 or 3:1:1 of $BaO \cdot Al_2O_3 \cdot CaO$. While the 3-constituent impregnant gives the highest emission, if desired barium aluminate with the barium oxide content exceeding 60% by weight may also be used. The carbon compound content can be varied over a fairly wide range. The amount does not appear too critical. Amounts in excess of 6% should preferably not be used to avoid carburization of the tungsten, which reduces emission. Generally, at least about 1% is needed to enhance the emission. While sugar is preferred, as convenient and inexpensive, other carbon containing compounds soluble in a suitable solvent and not completely evaporating during heating, are useful, such as a solution of glycerol in $H_2O$; poly-alcohol stearine acid in ether, etc. Also carbon suspensions such as aquadag, can be used. For completeness sake, it is noted that the $n$ in the formula $Al_2O_3 \cdot nH_2O$ refers to the fact that the aluminum oxide contains water of crystallization whose content is uncertain. Any water of course is evolved during the subsequent firing. Any binder useful for the spraying-process can be used, such as the known mixtures of butyl-, amylacetate and alcohol mixtures, which burn without residues during heating, can also be substituted in place of the nitrocellulose.

The viscosity of the suspension is chosen so that the suspension can be applied, for example, by spraying, by pouring or by cataphoresis, to the substrate 1 as a layer 2 having a thickness of, for example, 0.5 mm. After this layer has dried, a number of porous sintered tungsten discs 3 having, for example, a thickness of 1 mm. and a diameter of 3 mm. and a density of 80% are disposed on the layer 3. The tungsten discs may be made as described in U.S. Pat. 2,700,000. Subsequently, the plate 1 is passed through a tunnel furnace 5 by a transport device 4.

It is apparent from the graph of FIG. 2 that the furnace 5 is divided into zones having different lengths and different temperatures. The rate of passage is chosen so that the plates 1 travel through the furnace in about 50 minutes. In the zone A (10 minutes), the plates 1 and the bodies 3 are heated at 1000° C., and in the zone B they are kept at this temperature for about 10 minutes. The barium carbonate and the calcium carbonate of the layer 2 are then dissociated and the $CO_2$ converted in the hydrogen atmosphere to water vapor and CO is removed. At this high temperature, the porous tungsten of the bodies 3 may be slightly oxidized due to the water vapor developed. In the zone B, also the conversion of the layer 2 to barium calcium aluminate is initiated. In order to complete this conversion and to reduce the tungsten oxides, the bodies 3 are heated in zone C for 11 minutes to 1400° C. Since the direction of the current of hydrogen flowing through the furnace is opposite to the direction of travel, the gaseous products developed in the zone B are conducted to the inlet of the furnace so that a very pure hydrogen atmosphere prevails in zones D, E and F. After the aluminates have been formed and the bodies 3 have been reduced, the substrate 1 enters the zone D where the temperature is increased in 3 minutes to 1625° C. and the aluminate melts. In the zone E, the molten aluminate is allowed to be absorbed by the bodies 3 for about 20 to 30 seconds. After cooling in the zone F, the plates 1 and the bodies 3 leave the furnace and the impregnated bodies 3 can be processed in the normal way to cathodes as shown in FIG. 3.

For this purpose, the body is cleaned to remove excess aluminate and is then clamped with the interposition of a molybdenum plate 6 in a molybdenum cylindrical support 7 and a heater body 8 is then introduced into the cylinder 7. Alternatively, the holder 6, 7 consisting of molybdenum may be made in one piece by pressing so that a simpler construction is obtained.

Although only one embodiment of the porous tungsten bodies has been described, it will be appreciated that these bodies may also be shaped differently. In order to obtain a satisfactory contact between the surfaces of said bodies and the layer 2, the surface of the substrate 1 may be adapted thereto. For example, this substrate may exhibit a number of convex elevations for receiving porous bodies having a concave surface, whereas the substrate 1 may be rod-shaped or cylindrical for receiving cylindrical or rod-shaped porous bodies. In order to obtain a uniform impregnation in these cases the substrates and the porous bodies may be rotated if required. However, alternatively, the suspension of carbonates and sugar may be directly applied to the articles to be impregnated by spraying, immersion or pouring.

While we have described our invention in connection with specific embodiments and applications, other modifications thereof will be readily apparent to those skilled in this art without departing from the spirit of the invention.

What is claimed is:

1. A method of making an impregnated tungsted dispenser cathode, comprising the steps: forming a coprecipitated mixture of barium carbonate, calcium carbonate and aluminum oxide in proportions such that the mixture after dissociation of the carbonate contains barium oxide and aluminum oxide in a mole ratio exceeding 1:1, and the calcium oxide content is smaller than the barium oxide content; adding to said mixture a minor amount of a substance selected from the group consisting of sugar, glycerol, poly-alcohol stearine acid and aquadag in a range of about 1–6%; suspending the mixture in a binder; bringing said suspension into contact with a surface of a porous sintered tungsten body; subjecting the assembly in a hydrogen atmosphere to a continuous heating cycle, comprising:

heating in the hydrogen atmosphere at a first temperature of about 1000° C. until the carbonates are completely dissociated developing gasses and a reaction forming a barium calcium aluminate is initiated;

then heating in the hydrogen atmosphere at a second temperature of about 1400° C. at which the reaction forming the aluminates is accelerated and completed and at which any oxides formed in or on the porous body are reduced but below the melting point of any of the mixture constituents;

then heating in the hydrogen atmosphere at a third temperature of about 1600° C. at which the thus-formed aluminates melt and impregnate the porous tungsten body;

carbon from the added substance reacting with some calcium oxide to form calcium carbide;

then cooling the impregnated body and removing the gasses developed during the heating at the first temperature.

2. A method as set forth in claim 1, wherein the added substance is sugar in a content of about 3% by weight.

3. A method as set forth in claim 1 wherein the coprecipitated constituents comprises $BaCO_3$, $CaCO_3$ and $Al_2O_3$ in the mole ratio between about 5:3:2 and 3:1:1.

4. A method as set forth in claim 1 wherein the suspension is applied to a support to form a layer, and the porous tungsten body placed on the layer.

5. A method as set forth in claim 1 wherein the suspension is applied directly to the porous tungsten body to form a layer thereon.

References Cited

UNITED STATES PATENTS

| | | | |
|---|---|---|---|
| 1,974,608 | 9/1934 | Giard | 117—224 |
| 1,977,318 | 10/1934 | McCullough | 117—224X |
| 2,700,000 | 1/1955 | Levi et al. | 117—225X |
| 2,739,911 | 3/1956 | Andriulis et al. | 117—230X |
| 2,985,548 | 5/1961 | Blickwedel et al. | 117—224X |
| 3,201,639 | 8/1965 | Levi | 29—25.17X |

FOREIGN PATENTS

| | | | |
|---|---|---|---|
| 560,146 | 7/1958 | Canada | 117—230 |

ALFRED L. LEAVITT, Primary Examiner

T. E. BOKAN, Assistant Examiner

U.S. Cl. X.R.

29—25.17; 117—230; 252—521; 313—346